US011954147B1

(12) United States Patent
Della Santa

(10) Patent No.: US 11,954,147 B1
(45) Date of Patent: Apr. 9, 2024

(54) METHODS, SYSTEMS, AND MEDIA FOR TRACKING CONTENT ITEMS

(71) Applicant: David Della Santa, San Rafael, CA (US)

(72) Inventor: David Della Santa, San Rafael, CA (US)

(*) Notice: Subject to any disclaimer, the term of this patent is extended or adjusted under 35 U.S.C. 154(b) by 0 days.

(21) Appl. No.: 16/408,247

(22) Filed: May 9, 2019

Related U.S. Application Data

(60) Provisional application No. 62/669,905, filed on May 10, 2018.

(51) Int. Cl.
  *G06F 16/635* (2019.01)
  *G06F 3/0484* (2022.01)
  (Continued)

(52) U.S. Cl.
  CPC .......... *G06F 16/637* (2019.01); *G06F 3/0484* (2013.01); *G06F 3/165* (2013.01); *G06F 16/27* (2019.01)

(58) Field of Classification Search
  CPC .... G06F 16/27; G06F 3/04842; G06F 16/637; G06F 3/165
  See application file for complete search history.

(56) References Cited

U.S. PATENT DOCUMENTS 9,760,547 B1 * 9/2017 Brougher .............. G06F 16/958
11,397,919 B1   7/2022 Thiagrajan
(Continued)

FOREIGN PATENT DOCUMENTS

WO  WO-2015175566 A1 * 11/2015 ............. G06F 17/30

OTHER PUBLICATIONS

Netflix, Inc., "ASCAP/BMI Comments of Netflix, Inc.", Before the United States Department of Justice, Antitrust Division, Washington, D.C., Aug. 6, 2014, pp. 1-38.
(Continued)

*Primary Examiner* — Sang H Kim
(74) *Attorney, Agent, or Firm* — Byrne Poh LLP

(57) ABSTRACT

Methods, systems, and media for tracking content items are provided. In some embodiments, the method comprises: receiving, at a server associated with a content tracking service from a digital audio workstation associated with a composer, profile data corresponding to an audio content item created using the digital audio workstation; storing the profile data in connection with an identifier of the audio content item; receiving, at the server from the user device associated with the composer, an indication that the audio content item has been modified using the digital audio workstation; in response to receiving the indication that the audio content item has been modified using the digital audio workstation, updating the stored profile data corresponding to the audio content item; causing a user interface to be presented on the digital audio workstation associated with the composer, wherein the user interface includes at least one selectable input for selecting a publisher to which the audio content item is to be submitted, and wherein the user interface is presented within a website associated with the content tracking service; in response to receiving an input via the user interface, causing a notification to be presented on a computing device associated with the publisher that indicates that the audio content item has been submitted to the publisher and updating the profile data to indicate that the audio content item has been submitted to the publisher, wherein the notification is presented via a user interface presented within the website associated with the content tracking service; receiving, via the user interface presented on the computing device associated with the publisher, a request for information associated with the audio content item; and, in response to receiving the request, causing a subset of information included in the profile data corresponding to the audio content item to be presented within the (Continued)

user interface presented on the computing device associated with the publisher.

21 Claims, 4 Drawing Sheets

(51) Int. Cl.
*G06F 3/16* (2006.01)
*G06F 16/27* (2019.01)

(56) References Cited

U.S. PATENT DOCUMENTS

| | | | | |
|---|---|---|---|---|
| 2007/0130008 | A1* | 6/2007 | Brown | G06Q 30/0257 |
| | | | | 705/14.39 |
| 2012/0017150 | A1* | 1/2012 | Pollack | H04N 5/76 |
| | | | | 715/716 |
| 2012/0023251 | A1* | 1/2012 | Pyle | H04L 65/608 |
| | | | | 709/231 |
| 2013/0179761 | A1* | 7/2013 | Cho | G06Q 10/20 |
| | | | | 715/202 |
| 2013/0231931 | A1* | 9/2013 | Kulis | G06F 16/4393 |
| | | | | 704/235 |
| 2014/0115508 | A1* | 4/2014 | MacLean | G06F 16/93 |
| | | | | 715/764 |
| 2014/0258373 | A1* | 9/2014 | Lerman | H04L 67/1097 |
| | | | | 709/203 |
| 2016/0321769 | A1* | 11/2016 | McCoy | G06Q 50/184 |
| 2017/0046651 | A1* | 2/2017 | Lin | G06Q 20/065 |
| 2017/0116693 | A1* | 4/2017 | Rae | G06Q 50/184 |
| 2017/0295232 | A1* | 10/2017 | Curtis | G06F 9/466 |
| 2018/0005186 | A1 | 1/2018 | Hunn | |
| 2018/0343114 | A1 | 11/2018 | Ben-Ari | |
| 2021/0004923 | A1 | 1/2021 | Mackenzie | |
| 2021/0064784 | A1 | 3/2021 | Wei | |

OTHER PUBLICATIONS

Resnikoff, Paul, "A Comprehensive Comparison of Performance Rights Organizations (PROs) In the US", In Digital Music News, Feb. 20, 2018, pp. 1-11.

Resnikoff, Paul, "Max Martin, UMG, Avid, DDEX, Session Announce the 'World's First End-to-End Music Credits Ecosystem'", In Digital Music News, Mar. 18, 2019, pp. 1-4.

Schatz, Lake, "Musicians only received 12% of the music industry's $43 billion revenue in 2017", In Consequence, Aug. 7, 2018, pp. 1-5.

Yuan, R., et al., "ShadowEth: Private Smart Contract on Public Blockchain", In Journal of Computer Science and Technology, vol. 33, No. 3, May 2018, pp. 542-556.

* cited by examiner

METHODS, SYSTEMS, AND MEDIA FOR TRACKING CONTENT ITEMS

CROSS REFERENCE TO RELATED APPLICATIONS

This application claims the benefit of U.S. Provisional Patent Application No. 62/669,905, filed May 10, 2018, which is hereby incorporated by reference herein in its entirety.

TECHNICAL FIELD

The disclosed subject matter relates to methods, systems, and media for tracking content items.

BACKGROUND

Artists, such as songwriters or composers, may create songs or other compositions that may then be performed in different scenarios. For example, a song, or a version of a song, created by a songwriter may be included in an advertisement shown on television. As another example, a song, or a version of a song, may be included in a soundtrack of a movie. As yet another example, a song can be streamed from different content providers. It can be difficult to determine an origin of a composition, ownership information, and/or other rights information (e.g., an identity of a songwriter or composer, a current rightsholder, etc.) when it is included or played in different scenarios. This may particularly be a problem if a composition has been modified in some way (e.g., to remove particular instruments or vocals, to be faster or slower, etc.). Difficulty in determining an origin of a composition can cause several problems. For example, it can be difficult for a publisher that wants to license a composition to identify the composer and/or whether there are any usage restrictions for the composition. As another example, it can be difficult for a composer to receive royalty payments for use of the composition.

Accordingly, it is desirable to provide methods, systems, and media for tracking content items.

SUMMARY

Methods, systems, and media for tracking content items are provided.

In accordance with some embodiments of the disclosed subject matter, a method for tracking content items is provided, the method comprising: receiving, at a server associated with a content tracking service from a digital audio workstation associated with a composer, profile data corresponding to an audio content item created using the digital audio workstation; storing the profile data in connection with an identifier of the audio content item; receiving, at the server from the user device associated with the composer, an indication that the audio content item has been modified using the digital audio workstation; in response to receiving the indication that the audio content item has been modified using the digital audio workstation, updating the stored profile data corresponding to the audio content item; causing a user interface to be presented on the digital audio workstation associated with the composer, wherein the user interface includes at least one selectable input for selecting a publisher to which the audio content item is to be submitted, and wherein the user interface is presented within a website associated with the content tracking service; in response to receiving an input via the user interface, causing a notification to be presented on a computing device associated with the publisher that indicates that the audio content item has been submitted to the publisher and updating the profile data to indicate that the audio content item has been submitted to the publisher, wherein the notification is presented via a user interface presented within the website associated with the content tracking service; receiving, via the user interface presented on the computing device associated with the publisher, a request for information associated with the audio content item; and, in response to receiving the request, causing a subset of information included in the profile data corresponding to the audio content item to be presented within the user interface presented on the computing device associated with the publisher.

In some embodiments, the profile data corresponding to the audio content item is generated using a plugin installed on the digital audio workstation associated with the composer.

In some embodiments, the profile data includes information indicating current rights associated with the audio content item. In some embodiments, the current rights associated with the audio content item is updated in response to receiving, at the server associated with the content tracking service, an indication that the audio content item has been licensed.

In some embodiments, the profile data corresponding to the audio content item is stored using a blockchain.

In accordance with some embodiments of the disclosed subject matter, a system for tracking content items is provided, the system comprising a memory and a hardware processor that, when executing computer executable instructions stored in the memory, is configured to: receive, at a server associated with a content tracking service from a digital audio workstation associated with a composer, profile data corresponding to an audio content item created using the digital audio workstation; store the profile data in connection with an identifier of the audio content item; receive, at the server from the user device associated with the composer, an indication that the audio content item has been modified using the digital audio workstation; in response to receiving the indication that the audio content item has been modified using the digital audio workstation, update the stored profile data corresponding to the audio content item; cause a user interface to be presented on the digital audio workstation associated with the composer, wherein the user interface includes at least one selectable input for selecting a publisher to which the audio content item is to be submitted, and wherein the user interface is presented within a website associated with the content tracking service; in response to receiving an input via the user interface, cause a notification to be presented on a computing device associated with the publisher that indicates that the audio content item has been submitted to the publisher and updating the profile data to indicate that the audio content item has been submitted to the publisher, wherein the notification is presented via a user interface presented within the website associated with the content tracking service; receive, via the user interface presented on the computing device associated with the publisher, a request for information associated with the audio content item; and, in response to receiving the request, cause a subset of information included in the profile data corresponding to the audio content item to be presented within the user interface presented on the computing device associated with the publisher.

In accordance with some embodiments of the disclosed subject matter, a non-transitory computer-readable medium containing computer executable instructions that, when executed by a processor, cause the processor to perform a method for tracking content items is provided, the method comprising: receiving, at a server associated with a content tracking service from a digital audio workstation associated with a composer, profile data corresponding to an audio content item created using the digital audio workstation; storing the profile data in connection with an identifier of the audio content item; receiving, at the server from the user device associated with the composer, an indication that the audio content item has been modified using the digital audio workstation; in response to receiving the indication that the audio content item has been modified using the digital audio workstation, updating the stored profile data corresponding to the audio content item; causing a user interface to be presented on the digital audio workstation associated with the composer, wherein the user interface includes at least one selectable input for selecting a publisher to which the audio content item is to be submitted, and wherein the user interface is presented within a website associated with the content tracking service; in response to receiving an input via the user interface, causing a notification to be presented on a computing device associated with the publisher that indicates that the audio content item has been submitted to the publisher and updating the profile data to indicate that the audio content item has been submitted to the publisher, wherein the notification is presented via a user interface presented within the website associated with the content tracking service; receiving, via the user interface presented on the computing device associated with the publisher, a request for information associated with the audio content item; and, in response to receiving the request, causing a subset of information included in the profile data corresponding to the audio content item to be presented within the user interface presented on the computing device associated with the publisher.

In accordance with some embodiments of the disclosed subject matter, a system for tracking content items is provided, the system comprising: means for receiving, at a server associated with a content tracking service from a digital audio workstation associated with a composer, profile data corresponding to an audio content item created using the digital audio workstation; means for storing the profile data in connection with an identifier of the audio content item; means for receiving, at the server from the user device associated with the composer, an indication that the audio content item has been modified using the digital audio workstation; means for updating the stored profile data corresponding to the audio content item in response to receiving the indication that the audio content item has been modified using the digital audio workstation; means for causing a user interface to be presented on the digital audio workstation associated with the composer, wherein the user interface includes at least one selectable input for selecting a publisher to which the audio content item is to be submitted, and wherein the user interface is presented within a web site associated with the content tracking service; means for causing a notification to be presented on a computing device associated with the publisher that indicates that the audio content item has been submitted to the publisher and means for updating the profile data to indicate that the audio content item has been submitted to the publisher in response to receiving an input via the user interface, wherein the notification is presented via a user interface presented within the website associated with the content tracking service; means for receiving, via the user interface presented on the computing device associated with the publisher, a request for information associated with the audio content item; and means for causing a subset of information included in the profile data corresponding to the audio content item to be presented within the user interface presented on the computing device associated with the publisher in response to receiving the request.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
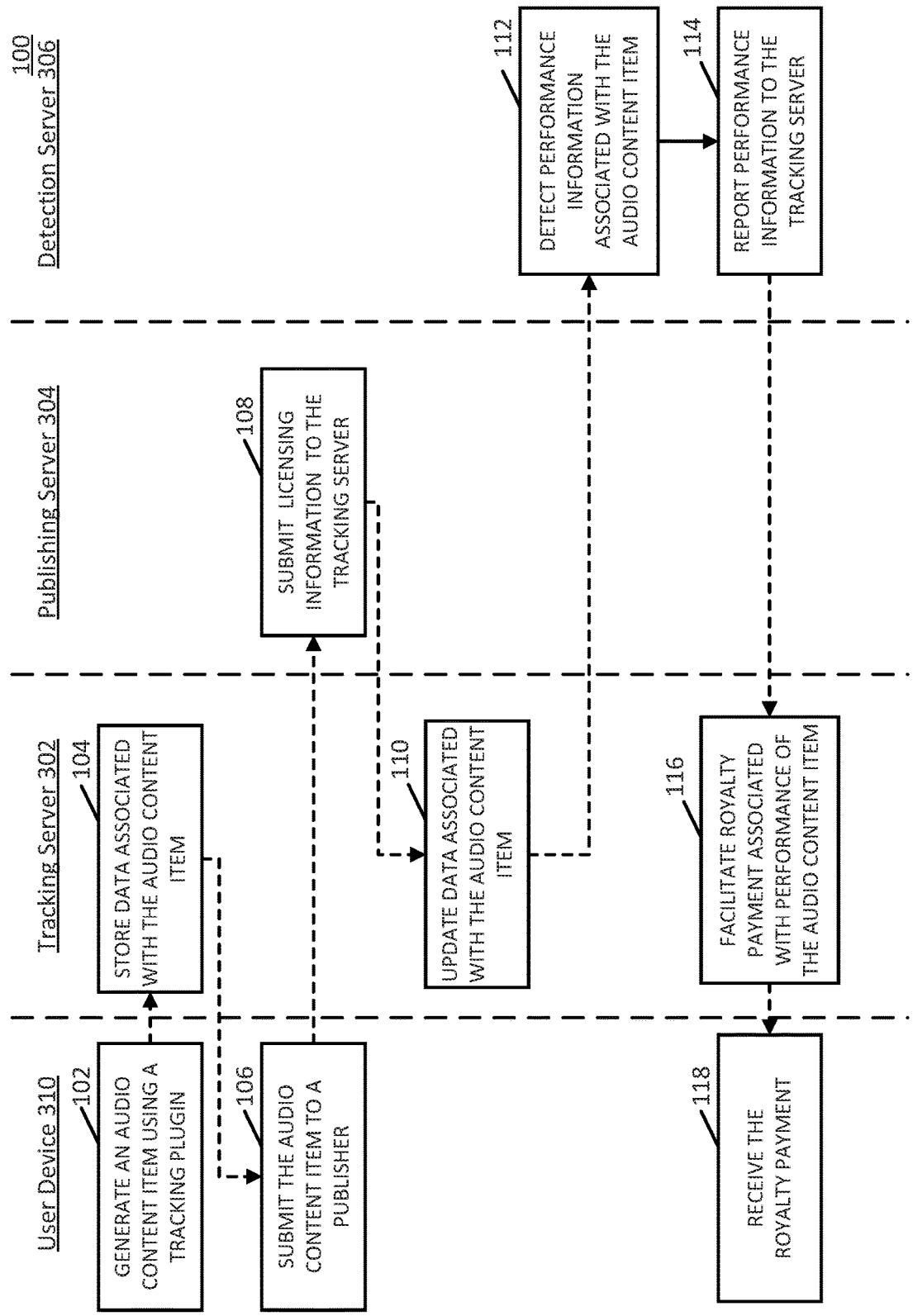
FIG. 1 shows an illustrative example of an information flow diagram for tracking content items in accordance with some embodiments of the disclosed subject matter.

In accordance with various embodiments, mechanisms (which can include methods, systems, and media) for tracking content items are provided.

In some embodiments, the mechanisms described herein can be used to track a generated audio content item. In some embodiments, the mechanisms can be associated with a tracking service. For example, in some embodiments, the tracking service can provide a plugin that can be installed on a device (e.g., a Digital Audio Workstation (DAW), and/or any other suitable device) used to create an audio content item, where the plugin can be used to generate profile data in connection with the audio content item. In some embodiments, the profile data can include information, such as an identifier of the audio content item, an identifier of an artist or composer who created the audio content item, a date the audio content item was created, and/or any other suitable information. In some embodiments, the mechanisms, using the plugin, can cause the profile data to be embedded in the audio content item. Additionally or alternatively, in some embodiments, the mechanisms can cause the profile data to be stored, for example, on a server associated with the tracking service.

In some embodiments, the tracking service can be used to allow an artist or composer who created an audio content item to submit the audio content item to a particular publisher or music house. Note that, although the mechanisms described herein are generally described as allowing an artist or a composer to submit an audio content item to a publisher, in some embodiments, the artist or the composer can submit the audio content item to any suitable entity, such as a music house, a licensor, a music supervisor, a producer, and/or any other suitable entity. For example, in some embodiments, the artist or the composer can use a user interface presented via a website associated with the tracking service to submit the audio content item to a selected publisher or music house. In some embodiments, the selected publisher or music house can then receive the submitted audio content item or a link to the submitted audio content item. For example, in some embodiments, a user associated with the publisher or music house can receive a notification of the submitted audio content item via a user interface presented via the website associated with the tracking service. In some embodiments, a publisher or music house can additionally use the website associated with the tracking service to submit the audio content item to a third party, such as an advertising agency (e.g., for inclusion of the audio content item in a soundtrack for an advertisement), a movie or television production agency (e.g., for inclusion of the audio content item in a soundtrack for a movie or television show), and/or any other suitable third party.

In some embodiments, the tracking service can store information associated with submission of the audio content item to any entity. For example, in some embodiments, the tracking service can store information associated with submission of the audio content item by the artist or composer to the publisher or the music house (e.g., a version of the audio content item that was submitted, a date the audio content item was submitted, etc.). As another example, in some embodiments, the tracking service can store information associated with submission of the audio content item by the publisher or the music house to a third party (e.g., a version of the audio content item that was submitted, a date the audio content item was submitted, etc.). Additionally, in some embodiments, in an instance in which the audio content item is licensed for use by a particular entity (e.g., by an advertising agency, by a movie or television production agency, and/or by any other suitable entity), the tracking service can store information indicating the license (e.g., by storing a signed license, by storing terms of a signed license, and/or storing any other suitable information). Note that, in some embodiments, the tracking service can be used to generate a license and/or transmit the license to any suitable parties associated with the license for signing.

In some embodiments, the tracking service can store information associated with the audio content item in any suitable manner. For example, in some embodiments, the tracking service can use a blockchain as a decentralized ledger to store information about the audio content item. For example, as shown in and described below in connection with FIGS. 1 and 2, the tracking service can generate an entry associated with the blockchain at a time the audio content item is created and can store information associated with the audio content item (e.g., track information, a date the audio content item was created, and/or any other suitable information). In some embodiments, the information can be stored in connection with a tracking identifier associated with the audio content item. As another example, in some embodiments, as described below in connection with FIG. 2, the blockchain can be updated in response to the audio content item being modified by the artist or composer, such as to indicate a new version of the audio content item. As yet another example, in some embodiments, the blockchain can be updated each time the audio content item is submitted to a different publisher, music house, or third party. As still another example, in some embodiments, the blockchain can be updated in response to a license being signed in association with the audio content item. Note that, in instances in which the tracking service stored information associated with the audio content item using a blockchain, the blockchain can be implemented using any suitable platform (e.g., Ethereum, and/or any other suitable platform). Note that, in some embodiments, a blockchain can be implemented using any suitable number of nodes. Additionally, note that, use of a blockchain to store information associated with the audio content item is given merely as an example. In some embodiments, information associated with an audio content item can be can be stored in any other suitable manner, such as on one or more servers. In some embodiments, a system used to store information associated with audio content items can be decentralized in any suitable manner, as described below in more detail.

In some embodiments, information stored by the tracking service can be accessed by any suitable entity at any suitable time, as described below in connection with FIG. 2. For example, in some embodiments, a user associated with a publisher, music house, or third party (e.g., an advertising agency that receives a submission of an audio content item) can use a user interface presented using a website associated with the tracking service to access information related to a particular audio content item. As a more particular example, in some embodiments, the user can identify a particular audio content item based on a tracking identifier associated with the audio content item (e.g., a tracking identifier that is generated by the plugin at a time of creation of the audio content item, and/or any other suitable tracking identifier), and can receive information stored by the tracking service via the user interface. In some embodiments, the information can include any suitable information, such as a current license that has been signed with respect to the audio content item, contact information for the artist or composer who created the audio content item, version information associated with the audio content item, a record of previous submissions of the audio content item to other entities, and/or any other suitable information stored by the tracking service. Note that, in some embodiments, an artist or a composer can use the tracking service to access any suitable records or analytics associated with the audio content item, such as royalty payments received in connection with the audio content item, and/or any other suitable information.

In some embodiments, as described below in connection with blocks 112-114 of FIG. 1, the mechanisms described herein can be used to facilitate royalty payments to an artist or a composer of an audio content item. For example, as described in connection with blocks 112-114 of FIG. 1, the mechanisms can be used to detect a performance of the audio content item (e.g., in an instance in which the audio content item is included in a soundtrack of a television show, movie, or advertisement, and/or any other suitable performance of the audio content item). In some embodiments, the mechanisms can detect performance of the audio content item in any suitable manner, such as by using audio fingerprints associated with the audio content item. In some embodiments, the tracking service can then invoice an entity that used the audio content item (e.g., a media outlet that used the audio content item, and/or any other suitable entity). The tracking service can then, in response to receiving payment associated with the invoice, cause the royalty payment to be credited to the artist or the composer.

Note that, in some embodiments, certain features associated with the tracking service can be provided to users using a user account associated with the tracking service. Additionally, in some embodiments, certain features provided by the tracking service can be provided to users who purchase a membership associated with the tracking service. For example, in some embodiments, a plugin that generates profile data for an audio content item and causes information associated with the audio content item to be stored by the tracking service can be made available to users (e.g., artists or composers) who purchase a membership associated with the tracking service. Additionally or alternatively, in some embodiments, certain features provided by the tracking service can be provided to a user regardless of whether the user has purchased a membership associated with the tracking service. For example, in some embodiments, a user can access information stored by the tracking service corresponding to a particular audio content item using a website provided by the tracking service regardless of whether the user has purchased a membership associated with the tracking service.

In some embodiments, membership to the tracking service by an artist or composer can allow the artist or the composer to access any suitable features provided by the tracking service. For example, in some embodiments, an artist or a composer can transmit, to the tracking service (e.g., a server or other device associated with the tracking service), any suitable audio content items created by the artist, as well as, in some embodiments, indications of mediums in which the audio content item is likely to be performed (e.g., via particular streaming services, in particular geographical regions, on particular television channels, etc.). In some embodiments, the tracking service can, using the techniques described in more detail below in connection with FIGS. 1 and 2, detect performances of the audio content items. In some embodiments, the tracking service can compare any suitable information associated with the detected performances with any suitable metrics provided by a Performance Rights Organization (PRO) or other entity the artist or composer is associated with. For example, in some embodiments, the tracking service can transmit to the artist indications of detected performances of a particular audio content item that were not detected by the PRO. In some embodiments, the tracking service can provide any other suitable information, such as an amount of royalty payment the artist would have made if the artist had used the tracking service as their PRO. In some embodiments, the information can be transmitted to the artist or the composer in any suitable manner, such as in a message generated by the tracking service that is emailed and/or transmitted in any other suitable manner to the artist or the composer. In some embodiments, the message can include any other suitable information, such as instructions to use the tracking service as their PRO, and/or any other suitable instructions.

Note that, in some embodiments, in instances in which the tracking service receives payments from users (e.g., a purchase of a membership associated with the tracking service, and/or any other suitable payment) and/or facilitates payments to users (e.g., a royalty payment to an artist or a composer, and/or any other suitable payment), the tracking service can use any suitable type of currency, such as a cryptocurrency, a fiat currency, and/or any other suitable type of currency. Note that, in instances in which the tracking service uses a cryptocurrency (e.g., a token associated with the tracking service, and/or any other suitable type of cryptocurrency), the tracking service can facilitate exchange of the cryptocurrency for fiat currency in any suitable manner and at any suitable time(s). Additionally, note that, in instances in which the tracking service uses any suitable type of cryptocurrency, the cryptocurrency can be subject to any suitable inflation scheme that can change a value of the cryptocurrency.

Additionally, note that, in some embodiments, tokens or other cryptocurrency used by the tracking service can be used to provide any suitable incentives for artist or composers, for nodes or entities that detect performances of audio content items, and/or any other suitable entities. For example, in some embodiments, in an instance in which a network (e.g., a television channel, a streaming service, and/or any other suitable network) reports a performance of a particular audio content item on the network, the network can be provided with any suitable number of tokens as a reward, thereby allowing the network to pay down or be subsidized for their royalty obligations. As another example, in some embodiments, artists or songwriters can invest tokens in their own work to increase the value of their earned performance royalties.

In some embodiments, the tracking service described herein can facilitate sponsorship of an artist or composer. For example, in some embodiments, consumers or fans can invest in an artist's work in returns for partial ownership of musical works and/or royalties generated by the works. In some such embodiments, the tracking service can facilitate sponsorship of an artist in any suitable manner, for example, by receiving payment from one or more consumers or fans, distributing received payment in any suitable manner, storing information indicating received payment, and/or in any other suitable manner.

Turning to FIG. 1, an illustrative example 100 of an information flow diagram for tracking content items is shown in accordance with some embodiments of the disclosed subject matter. As illustrated, in some embodiments, blocks of process 100 can be performed on a user device 310 (e.g., a user device associated with a content creator, such as a songwriter or composer, and/or any other suitable content creator), a tracking server 302, a publishing server 304, and/or a detection server 306. Note that, in some embodiments, tracking server 302 can be associated with a tracking service, as described above.

At 102, user device 310 can generate an audio content item using a plugin (e.g., the tracking plugin described above, and/or any other suitable plugin) installed on user device 310. In some embodiments, the plugin can be an authorized plugin that opens a communication channel between a device on which the plugin is installed, such as a digital audio workstation, and a tracking service. For example, in response to installing a plugin on a suitable device, the plugin can be authenticated by the tracking service using, for example, a user account, a user identifier, a plugin identifier, etc. In continuing this example, in response to the plugin not being authenticated by the tracking service (e.g., not being an approved plugin), audio content item information and/or any data generated by the plugin may not be transmitted to the tracking service.

Note that, in some embodiments, user device 310 can be a DAW or can include a software DAW that is used for creating and/or editing audio content items. In some embodiments, the tracking plugin can be a plugin that is associated with the DAW in any suitable manner. In some embodiments, the tracking plugin can perform any suitable functions associated with the audio content item. For example, in some embodiments, the tracking plugin can generate data that includes any suitable information about the audio content item, such as an identifier of the audio content item, an identifier of a user of user device 310 (e.g., an identifier of a creator of the audio content item), contact information associated with the user of user device 310, publishing information associated with the audio content item (e.g., licensing information, rights information indicating usage restrictions associated with the audio content item, identifiers of record labels or other publishing entities that have rights to the audio content item, and/or any other suitable information), genre information associated with the audio content item, instrumental information associated with the audio content item (e.g., indications of particular instruments included in the audio content item, and/or any other suitable instrumental information), a date of creation of the audio content item, and/or any other suitable information. Note that, in some embodiments, the data generated by the tracking plugin that corresponds to the audio content item can be referred to herein as profile data.

Note that, in some embodiments, the tracking plugin can receive information that is used to generate the profile data in any suitable manner. For example, in some embodiments, information related to a creator of the audio content item (e.g., the user of user device 310) can be entered by the user of user device 310 at any suitable time, such as during or after installation of the plugin on user device 310. As another example, in some embodiments, the plugin can receive template information during or prior to creation of the audio content item. As a more particular example, in some embodiments, the user of user device 310 can select, via a user interface presented using the plugin, a template that indicates a genre associated with the audio content item, where information associated with the template can be used to create the profile data. As a specific example, in an instance in which the user of user device 310 selects a rock template, the plugin can generate profile data that indicates that the audio content item includes particular instruments (e.g., guitar, bass, drums, vocals, and/or any other suitable instruments).

In some embodiments, the tracking plugin can embed any suitable information associated with the profile data into the audio content item. For example, in some embodiments, the tracking plugin can cause any suitable watermarking to be embedded in a file associated with the audio content item. Additionally, in some embodiments, the tracking plugin can cause any suitable profile data to be transmitted to tracking server 302, as shown in FIG. 1. Note that, in some embodiments, the tracking plugin can retrospectively generate profile data for any other audio content items stored on user device 310 that were, for example, created prior to installation of the plugin. In some such embodiments, the tracking plugin can embed any suitable profile data into audio content items previously created using any suitable type of batch processing system. Additionally or alternatively, in some embodiments, the tracking plugin can cause any suitable profile data associated with previously created audio content items to be transmitted to tracking server 302. Note that, in some embodiments, the tracking plugin can additionally or alternatively cause the audio content item to be transmitted to tracking server 302.

Note that, in some embodiments, the tracking plugin can cause any suitable profile data to be stored locally on user device 302. In some such embodiments, the tracking plugin can cause the profile data to be stored in any suitable manner, for example, in connection with an identifier of the audio content item. In some embodiments, profile data that has been stored can be searched using the plugin in any suitable manner. For example, in some embodiments, the profile data can be searched to identify audio content items created using the DAW associated with user device 310 based on any suitable criteria, such as instruments included in the audio content item, a date of creation, a date of modification, and/or any other suitable search criteria.

Additionally, note that, in some embodiments, user device 310 can download the plugin from any suitable source. For example, in some embodiments, user device 310 can download the plugin from a website associated with the tracking service. Note that, in some embodiments, user device 310 can receive an option to download the plugin in any suitable manner, such as in response to purchasing a membership to the tracking service, in response to subscribing to the tracking service, and/or based on any other suitable information.

In some embodiments, user device 310 can additionally or alternatively download any other suitable applications, such as a wallet application (e.g., a built-in Ethereum wallet, and/or any other suitable wallet application).

At 104, tracking server 302 can store profile data associated with the audio content item received from user device 310. In some embodiments, tracking server 302 can store the profile data in any suitable manner. For example, in some embodiments, tracking server 302 can store the profile data on a blockchain or on multiple blockchains. In some such embodiments, tracking server 302 can store the profile data in connection with any suitable information, such as an identifier of user device 310, an identifier of a user of user device 310 or an identifier of a creator of the audio content item associated with the profile data, and/or in any other suitable manner. Note that, in some embodiments, any updates to the profile data (e.g., updates indicating that a corresponding audio content item have been modified, updates indicating that a corresponding audio content item has been licensed to a particular entity, and/or any other suitable profile data updates) can be tracked using the blockchain, as described below in connection with FIG. 2.

Note that, in some embodiments, in response to receiving the audio content item, tracking server 302 can perform any other suitable functions. For example, in some embodiments, tracking server 302 can generate any suitable fingerprints associated with the audio content item. As another example, in some embodiments, tracking server 302 can identify any suitable royalty splits associated with the audio content item based on information transmitted from user device 310 in connection with the audio content item. As a more particular example, in some embodiments, an email address associated with another artist associated with creation of the audio content item, an ownership percentage of the other artist, and/or any other suitable information can be used to generate metadata that is stored in connection with the audio content item. As a specific example, in some embodiments, the email address (and/or any other suitable identifier of the other artist) can be hashed with the ownership percentage to generate the metadata.

Note that, in some embodiments, tracking server 302 can make the audio content item associated with the profile data available in any suitable manner. For example, in some embodiments, tracking server 302 can provide a library of audio content items received from multiple creators. As a more particular example, in some embodiments, tracking server 302 can provide a library of audio content items via a portal that can allow the library of audio content items to be searched in any suitable manner and based on any suitable criteria (e.g., based on a name of a songwriter or composer, based on genre, and/or based on any other suitable criteria). Note that, in some embodiments, tracking server 302 can use the profile data for allowing the library of audio content items to be searched. For example, in some embodiments, tracking server 302 can allow a user of a website interface to search for audio content items stored in the library of audio content items based on an indicated genre, and tracking server 302 can identify audio content items stored in the library of audio content items that are associated with profile data that match the indicated genre. Note that, in some embodiments, tracking server 302 can cause particular audio content items to appear higher in a search in response to receiving a payment from an artist or composer to boost a ranking of the audio content items. In some embodiments, tracking server 302 can allow particular audio content items to be played from the library of audio content items in any suitable manner, for example, by allowing the audio content item to be streamed or downloaded in exchange for a fee, and/or in any other suitable manner. As another example, in some embodiments, tracking server 302 can facilitate licensing of particular audio content items stored in the library of audio content items by any suitable entity. As a more particular example, in some embodiments, tracking server 302 can generate a contract or license that includes any suitable terms, and can cause the generated license to be distributed to any suitable parties, as described below in more detail in connection with block 216 of FIG. 2.

At 106, user device 310 can indicate that the audio content item is to be submitted to a publisher, such as a publisher associated with publishing server 304. Note that, in some embodiments the publisher can be associated with any suitable entity, such as a music house, a record label, an agent, and/or any other suitable entity. In some embodiments, the audio content item can be submitted to publishing server 304 in any suitable manner. For example, in some embodiments, the audio content item can be transmitted from tracking server 302 to publishing server 304 in response to receiving the indication from user device 310. That is, in some embodiments, the audio content item can be transmitted to publishing server 304 using tracking server 302 and based on an indication received from user device 310. Note that, more detailed techniques for submitting the audio content item to a publisher are described below in connection with block 206 of FIG. 2.

Note that, in some embodiments, tracking server 302 can cause an indication that the audio content item is being submitted to the publisher or has been submitted to the publisher to be stored in any suitable manner. For example, in some embodiments, tracking server 302 can cause the indication that the audio content item is being submitted to the publisher or has been submitted to the publisher to be stored in an updated entry or a new entry on the blockchain. In some embodiments, any suitable information associated with submittal of the audio content item can be stored, such as a date the audio content item was submitted to the publisher, identifiers of a sender and a receiver of the audio content item (e.g., an identifier associated with user device 310 and/or publishing server 304), and/or any other suitable information can be stored.

Additionally, note that, in some embodiments, publishing server 304 can cause the received audio content item and/or any data (e.g., the profile data or a subset of the profile data) to be presented to a user accessing publishing server 304 in any suitable manner. For example, in some embodiments, publishing server 304 can cause the audio content item and/or the profile data associated with the audio content item to be presented within a user interface presented in connection with a website associated with the tracking service.

At 108, publishing server 304 can transmit any suitable licensing information to tracking server 302. For example, in some embodiments, as described in more detail below in connection with block 218 of FIG. 2, in some embodiments, tracking server 302 can generate a license for use of the audio content item by an entity associated with publishing server 304. In some such embodiments, publishing server 304 can transmit any suitable information associated with a generated license, such as a signed contract, information to be entered into a contract, and/or any other suitable information.

At 110, tracking server 302 can update data associated with the audio content item. In some embodiments, tracking server 302 can update the data associated with the audio content item in any suitable manner and based on any suitable information. For example, as described above in connection with block 108, in some embodiments, tracking server 302 can update data associated with the audio content item to indicate licensing information associated with the audio content item. As a more particular example, in some embodiments, tracking server 302 can update the data associated with the audio content item to indicate that the audio content item has been licensed to a particular entity, such as an entity associated with publishing server 304, and/or any other suitable entity. Note that, in some embodiments, in instances in which tracking server 302 updates data associated with the audio content item to reflect licensing information, the licensing information can indicate any suitable information associated with a license for the audio content item, such as any terms of the license, royalty payments to be made in connection with use of the audio content item, and/or any other suitable information.

As another example, as shown in and described below in connection with block 212 of FIG. 2, in instances in which the audio content item is modified in any suitable manner, tracking server 302 can update data associated with the audio content item to indicate modifications to the audio content item. As a more particular example, in an instance in which the audio content item is modified on user device 310, user device 310 can transmit updated data to tracking server 302 indicating a new version number of the audio content item, indications of any changes made to the audio content item (e.g., timestamps of changes, and/or any other suitable indications), and/or any other suitable modifications. As another more particular example, in an instance in which any suitable splits of the audio content item are generated (e.g., a first split corresponding to vocals of the audio content item, a second split corresponding to dialog, a third split corresponding to a particular instrument, etc.), in some embodiments, user device 310 can store tracks corresponding to each split and can transmit information to tracking server 302 indicating any suitable information corresponding to each generated split (e.g., a date and/or time of creation of the split, an identifier corresponding to each generated split, a fingerprint associated with each generated split, an identifier that connects a generated split to the audio content item from which the split was generated, and/or any other suitable information). In some embodiments, each split can inherit any suitable profile data associated with the audio content item from which the split was generated. For example, in some embodiments, profile data associated with each split can be stored in connection with an identifier associated with the parent audio content item from which the split was generated. Additionally or alternatively, in some embodiments, each split can inherit any suitable rights associated with the audio content item from which the split was generated.

Note that, in some embodiments, tracking server 302 can facilitate detection of performance of the audio content item, invoicing of an entity that uses the audio content item, and/or payment of a royalty associated with performance of the audio content item to a creator of the audio content item (e.g., a user of user device 310). In some embodiments, blocks 112-118 shown in FIG. 1 and described below in more detail describe techniques for detection of performance of the audio content item and facilitating payment of a royalty associated with the audio content item.

At 112, detection server 306 can detect performance information associated with the audio content item. Note that, in some embodiments, detection server 306 can be any suitable entity. For example, in some embodiments, detection server 306 can be associated with a third-party entity that has signed up with a particular service to detect performance of particular audio content items (e.g., in exchange for payment, and/or in any other suitable manner). In some embodiments, detection server 306 can detect performance of the audio content item in any suitable manner. For example, in some embodiments, detection server 306 can detect performance of the audio content item in a commercial (e.g., in a television commercial, in a radio commercial, and/or in any other suitable commercial), in a movie, in a television show, in live-streamed content, and/or included in any other suitable type of performance. In some embodiments, detection server 306 can detect performance of the audio content item in any suitable manner. For example, in some embodiments, detection server 306 can store a group of audio fingerprints corresponding to any suitable group of audio content items, and can detect a match between an audio fingerprint stored in the group of audio fingerprints and a performance of the audio content item. Note that, in some embodiments, detection server 306 can transmit any suitable audio fingerprints, watermarks, or other information to a third-party detection service, and can receive information from the third-party detection service indicating that performance of the audio content item has been detected by the third-party detection service. In some embodiments, a third-party detection service and detection server 306 can transmit information in any suitable manner, such as using an API (e.g., an API provided by an entity associated with tracking server 302, and/or any other suitable API).

At 114, detection server 306 can transmit information indicating the detected performance to tracking server 302. In some embodiments, detection server 306 can transmit any suitable information indicating the detected performance. For example, in some embodiments, detection server 306 can transmit information indicating a date and/or a time the performance was detected, information indicating content in which the audio content item was included (e.g., a name of a commercial in which the audio content item was included, a name of a television show or movie in which the audio content item was included in a soundtrack, etc.), and/or any other suitable information.

Note that, in some embodiments, blocks 112 and/or 114 can be omitted.

At 116, tracking server 302 can facilitate royalty payments associated with the detected performance of the audio content item. For example, in some embodiments, tracking server 302 can use the detection information to identify an entity to be invoiced for the detected performance of the audio content item and can cause an invoice to be transmitted to the identified entity. As a more particular example, in some embodiments, tracking server 302 can transmit an invoice to a media outlet (e.g., to an email address associated with the media outlet, and/or in any other suitable manner) that included the audio content item in a soundtrack of a particular television show. As another example, in some embodiments, tracking server 302 can receive a payment from an invoiced entity in response to transmitting the invoice, and can cause a royalty payment to be credited to an account associated with a user of user device 302. In some embodiments tracking server 302 can receive payments and credit royalty payments using any suitable payment software or applications. In some embodiments, tracking server 302 can process payments in a semi-automated manner. Additionally or alternatively, in some embodiments, tracking server 302 can process payments using one or more smart contracts, for example, a smart contract associated with the blockchain. Note that, as described above, in some embodiments, payments can be made using any suitable type of currency, such as a cryptocurrency associated with the tracking service, a fiat currency, and/or any other suitable type of currency.

Note that, in some embodiments, tracking server 302 can receive the performance detection information from detection server 306 and can update the blockchain with the performance detection information (e.g., a date and/or time performance of the audio content item was detected, information about the content in which the audio content item was detected, and/or any other suitable performance detection information), invoice information (e.g., a date and/or a time an invoice was transmitted, an identifier of an entity that received the invoice, an amount associated with the invoice, and/or any other suitable invoice information), and/or royalty payment information (e.g., an amount of a royalty payment paid to a user of user device 310, a date and/or a time of the royalty payment, an identifier of a license associated with the audio content item and the royalty payment, and/or any other suitable information).

At 116, user device 110 can receive the royalty payment. Note that, in some embodiments, user device 110 can receive the royalty payment in any suitable manner. For example, in some embodiments, a user account associated with a user of user device 110 and associated with the tracking service can be credited with a payment corresponding to the royalty payment. Note that, in some embodiments, user device 110 can present a notification indicating that the royalty payment has been transmitted to the user account. For example, in some embodiments, user device 110 can cause a notification to be presented that indicates the royalty payment in connection with a user interface of a website associated with the tracking service. Note that, in some embodiments, the notification can include any other suitable information or content, such as an audio clip that includes a portion of the audio content item (e.g., a three second clip, a five second clip, and/or any other suitable portion of the audio content item).

In some embodiments, an artist associated with user device 110 can claim an asset assigned to them in any suitable manner. For example, in some embodiments, the artist can prove their identity to the tracking service in any suitable manner. In some embodiments, the tracking service can implement any suitable consensus algorithm to verify a claim.

Note that, in some embodiments, user device 110 can cause a user interface (e.g., a user interface of a website associated with the tracking service, and/or any other suitable user interface) to be presented in which a user of user device 110 can access any suitable reports or metrics associated with royalty payments for content items created by the user of user device 110. For example, in some embodiments, the reports or metrics can indicate multiple royalty payments associated with the audio content item (e.g., associated with different performances of the audio content item, etc.). As another example, in some embodiments, the reports or metrics can indicate royalty payments corresponding to multiple different audio content items created by the user of user device 310.

Note that, in some embodiments, communication between any devices (e.g., between user device 110 and tracking server 302, between publishing server 304 and tracking server 302, between detection server 306 and tracking server 302, and/or any other suitable devices) can be implemented in any suitable manner. For example, in some embodiments, a device can use an Application Programming Interface (API) associated with and/or provided by the tracking service to communicate in any suitable manner with a server associated with the tracking service (e.g., with tracking server 302). As another example, in some embodiments, a device can use an API to access information or modify information stored by a blockchain. As yet another example, in some embodiments, a device can use an API to facilitate payment to an artist or a composer for a performance of an audio content item. As a more particular example, in some embodiments, a license to use a particular audio content item can be sold using the API>

Figure 2:
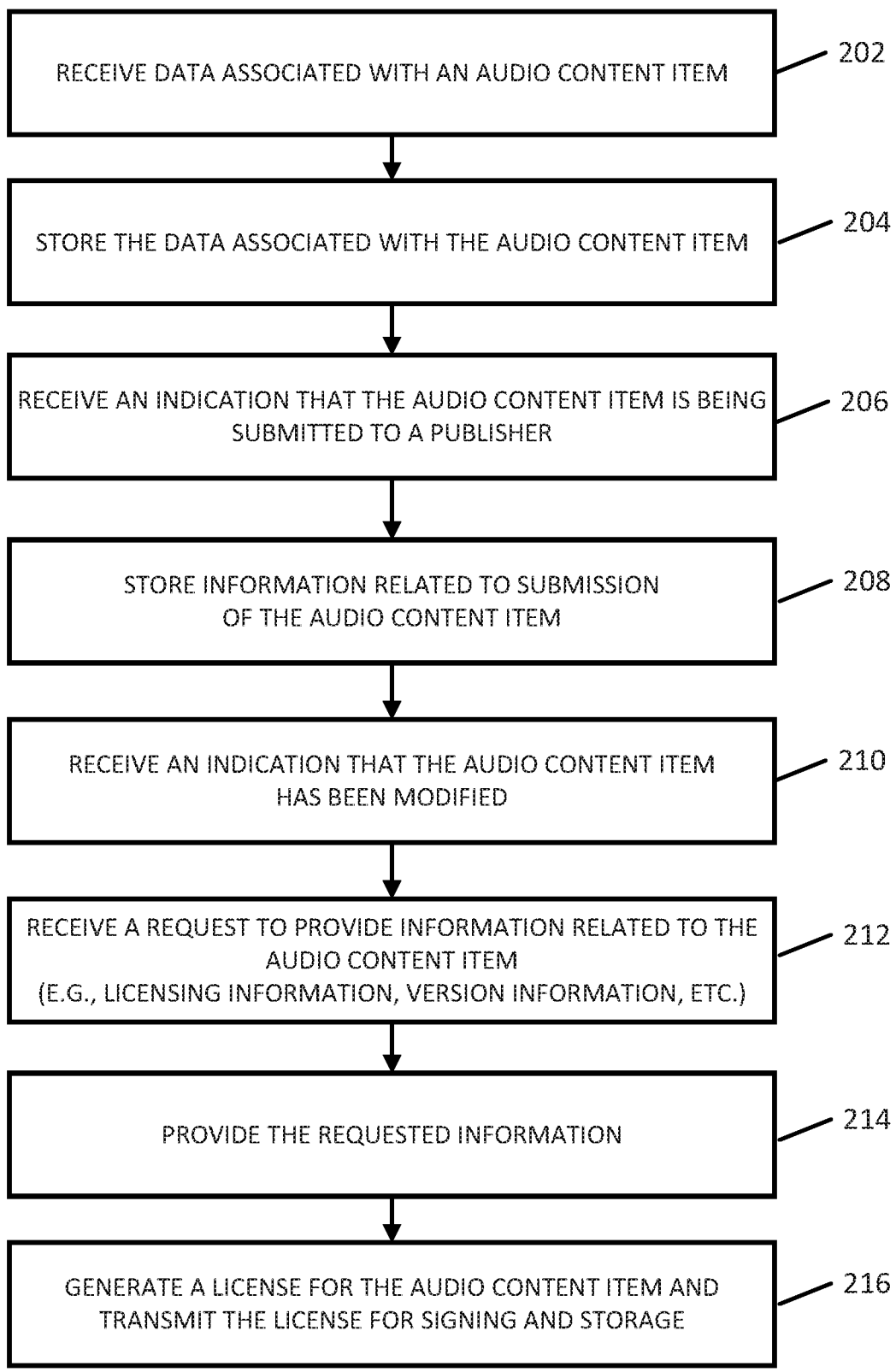
FIG. 2 shows an illustrative example of a process for tracking content items in accordance with some embodiments of the disclosed subject matter.

Turning to FIG. 2, an example 200 of a process for tracking content items is shown in accordance with some embodiments of the disclosed subject matter. In some embodiments, blocks of process 200 can be executed by tracking server 302. In some such embodiments, tracking server 302 can be associated with a tracking service, as described above.

Process 200 can begin at 202 by receiving an audio content item and/or data associated with an audio content item. As shown in and described above in connection with blocks 102 and 104 of FIG. 1, the data can correspond to profile data associated with the audio content item. For example, as described above in connection with block 102, in some embodiments, the profile data can be profile data generated by a user device or a DAW used to create the audio content item that indicates any suitable information about the audio content item or the creator of the content item. As a more particular example, in some embodiments, the profile data can indicate a date and/or a time of creation of the audio content item, an identifier of the creator of the audio content item, information indicating rights associated with the audio content item (e.g., current licenses associated with the audio content item, and/or any other suitable information indicating rights associated with the audio content item), information about the audio content item (e.g., instruments used in the audio content item, version information, identifiers of splits generated based on the audio content item, and/or any other suitable information), and/or any other suitable information. Note that, in some embodiments, the profile data can include a tracking identifier associated with the audio content item that can be used to index other data or information related to the audio content item that is stored using tracking server 302 and/or the tracking service. As described above, in some embodiments, the profile data can be generated by the user device that created the content item using a plugin installed on the user device. In some such embodiments, the plugin can be downloaded to the user device from any suitable source, such as a website associated with the tracking service.

In some embodiments, process 200 can receive the audio content item and/or the data associated with the audio content item in any suitable manner. For example, in some embodiments, process 200 can receive the data from a user device or a DAW used to create the audio content item. As a more particular example, as described above in connection with block 102 of FIG. 1, in some embodiments, process 200 can receive the data associated with the audio content item via a plugin installed on the user device used to create the profile data associated with the audio content item.

At 204, process 200 can store the data associated with the audio content item. In some embodiments, process 200 can store the data in any suitable manner. For example, in some embodiments, process 200 can store the data in association with an identifier corresponding to the audio content item (e.g., a tracking identifier generated by a plugin installed on the user device during generation of the profile data associated with the audio content item). As another example, in some embodiments, process 200 can update a blockchain that stores data associated with different audio content items. As a more particular example, in some embodiments, process 200 can generate a new blockchain entry that includes the received data corresponding to the audio content item.

Note that, in instances in which process 200 stores the received data using a blockchain, the blockchain can be implemented in any suitable manner and using any suitable platform. Additionally, note that, in some embodiments, the blockchain can be a public blockchain that can be queried and/or accessed by different entities. In some embodiments, the blockchain can generate a profile that is stored on the blockchain and that is associated with the tracking identifier corresponding to the audio content item generated by the plugin installed on the user device used to create the audio content item. Additionally or alternatively, in some embodiments, a decentralized application (DAPP) associated with the blockchain can generate a unique identifier that is embedded in a file corresponding to the audio content item and that is stored in connection with the profile on the blockchain.

Figure 3:
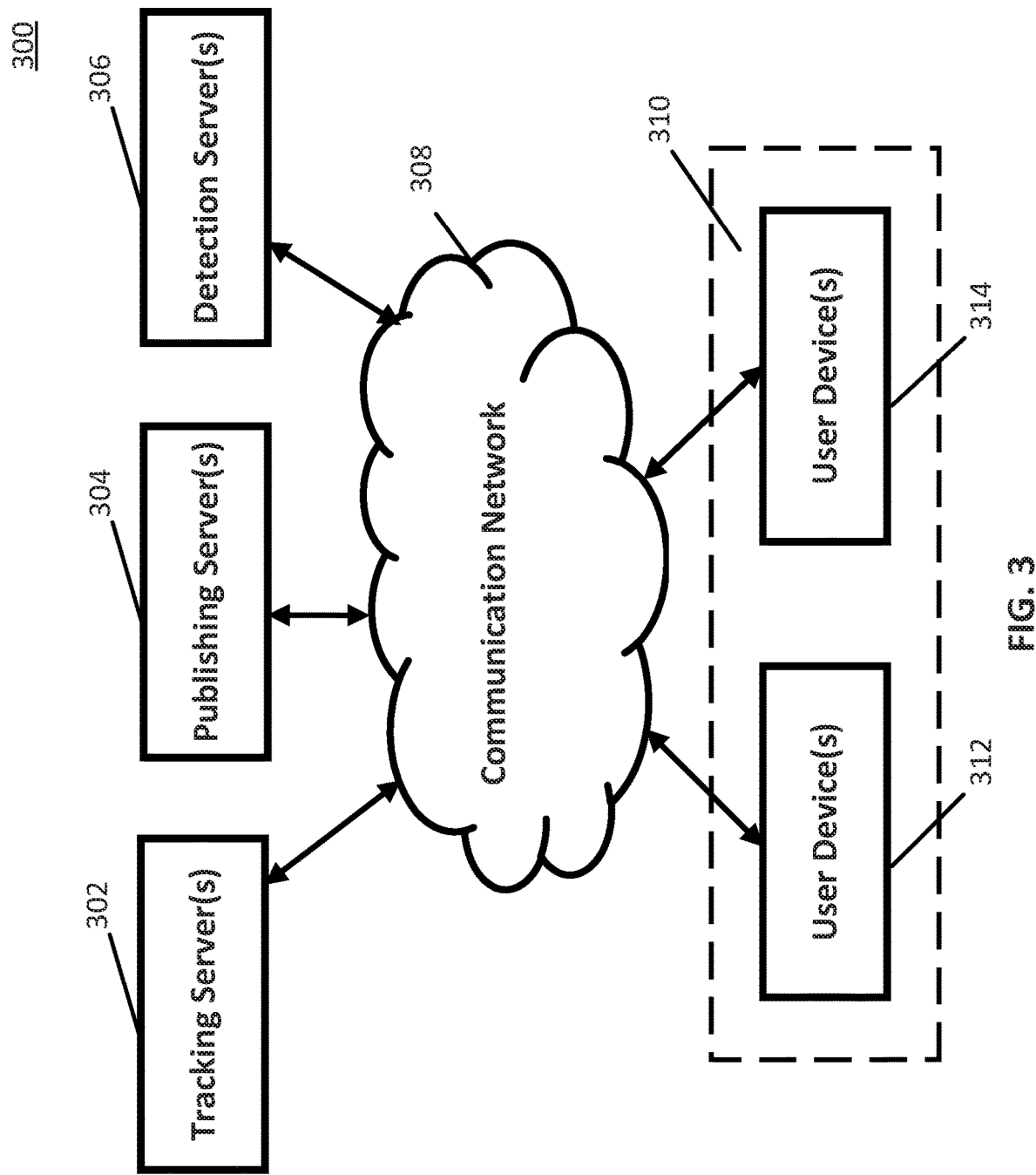
FIG. 3 shows a schematic diagram of an illustrative system suitable for implementation of mechanisms described herein for tracking content items in accordance with some embodiments of the disclosed subject matter.

Note that, in some embodiments, process 200 can perform any other suitable functions in response to receiving the audio content item and/or the data associated with the audio content item. For example, in some embodiments, process 200 can extract any suitable information (e.g., metadata associated with the audio content item, one or more fingerprints or fingerprint hashes, one or more watermarks, and/or any other suitable embedded information). In some embodiments, process 200 can extract any suitable information to a file of any suitable format (e.g., a JSON file, and/or any other suitable file type). As another example, in some embodiments, process 200 can generate any suitable files or other content. As a more particular example, in some embodiments, can generate a thumbnail image to be associated with the audio content item. As another more particular example, in some embodiments, process 200 can create and/or upload an InterPlanetary File System (IPFS) hash that, in some embodiments, provides a single hash for all entities related to a track (e.g., using directory wrapping, and/or in any other suitable manner). As yet another example, in some embodiments, process 200 can register the audio content item with a smart contract. As still another example, in some embodiments, process 200 can cause a notification to be transmitted to users who have subscribed to a genre of content corresponding to a genre of the received audio content item. As still another example, in some embodiments, process 200 can update any suitable indexes associated with the tracking service to reflect the upload of the audio content item. As still another example, in some embodiments, process 200 can transmit a notification to any suitable nodes or other servers, such as a detection node or server (e.g., detection server 306 as shown in FIG. 3) that indicates the newly uploaded audio content item.

At 206, process 200 can receive an indication that the audio content item is being submitted to a publisher. Note that, in some embodiments, the publisher can be any suitable entity that performs any suitable functions. For example, in some embodiments, the publisher can be a music house, a music licensing library, a record label, and/or any other suitable entity. As a more particular example, in some embodiments, the publisher can be a music house that submits the audio content item to another party (e.g., an advertisement agency, and/or any other suitable third-party) for a particular job (e.g., as a soundtrack for an advertisement).

In some embodiments, process 200 can receive the indication that the audio content item is being submitted to the publisher in any suitable manner. For example, in some embodiments, a user who created the audio content item can indicate (e.g., via a user interface presented on a user device associated with the user, and/or in any other suitable manner) a name or other identifier of the publisher and an indication of the audio content item that is to be submitted.

Note that, in some embodiments, process 200 can, in response to receiving the indication that the audio content item is being submitted to the publisher, cause an indication of the audio content item to be transmitted to the indicated publisher. For example, in some embodiments, process 200 can generate a message or notification that includes the audio content item or a link to the audio content item, and can cause the message or notification to be presented on a device associated with the publisher. As a more particular example, in some embodiments, process 200 can cause the message or the notification to be presented in connection with a user account associated with a user associated with the publisher and with the tracking service, such as in a user interface that is presented in connection with the user account when the user logs in to the user account. In some such embodiments, the user interface can be presented in connection with a website associated with the tracking service. In some embodiments, the message or the notification can include any other suitable information, such as a name of a creator of the audio content item, information about the audio content item (e.g., a name of the audio content item, version information, instruments included in the audio content item, current license information associated with the audio content item, and/or any other suitable information). Additionally, in some embodiments, the message or the notification can include instructions for submitting, from the publisher, the audio content item to a third party (e.g., an advertisement agency, and/or any other suitable third-party) using the tracking service.

At 208, process 200 can store information related to submission of the audio content item. In some embodiments, process 200 can store the information in any suitable manner. For example, in some embodiments, process 200 can store information related to the submission to the publisher using the blockchain. In some embodiments, any suitable information can be stored, such as a date and/or a time the audio content item was submitted to the publisher, an identifier of the publisher (e.g., an email address associated with the publisher, a name of the publisher, and/or any other suitable identifier), identifying information associated with the audio content item (e.g., a track identifier associated with the audio content item, one or more audio fingerprints, and/or any other suitable information), information associated with a creator of the audio content item (e.g., a username or other identifier of the creator, an email address associated with the creator, and/or any other suitable information), and/or any other suitable information.

Note that, in instances in which the audio content item is submitted by the publisher to a third party (e.g., an advertisement agency, and/or any other suitable third party), information related to submittal of the audio content item from the publisher to the third party can additionally be stored, for example, using the blockchain. In some embodiments, any suitable information can be stored, such as a date and/or a time of submittal of the audio content item to the third party, version information associated with the submitted audio content item, and/or any other suitable information.

At 210, process 200 can receive an indication that the audio content item has been modified. In some embodiments, process 200 can store information indicating that the audio content item has been modified in any suitable manner. For example, in some embodiments, process 200 can store the information indicating that the audio content item has been modified using the blockchain. As a more particular example, in some embodiments, process 200 can update the blockchain to indicate a new version number associated with the modified audio content item. As another more particular example, in some embodiments, process 200 can update the blockchain with updated profile data corresponding to the modified audio content item, such as updated profile data indicating new or different instrumentals associated with the modified audio content item.

At 212, process 200 can receive a request to provide information related to the audio content item. In some embodiments, process 200 can receive the request to provide the information related to the audio content item from any suitable entity. For example, in an instance in which the audio content item was submitted from the publisher to a third party (e.g., an advertisement agency, and/or any other suitable third party), the request can be received from the third party. In some embodiments, the request can be received in any suitable manner. For example, in some embodiments, the request can be received via a user interface (e.g., a user interface presented on a website associated with the tracking service, and/or any other suitable user interface). As a more particular example, in some embodiments, the user interface can allow a user requesting the information to indicate the audio content item in any suitable manner (e.g., by indicating a track identifier associated with the audio content item, by indicating audio fingerprints associated with the audio content item, and/or any other suitable information). Note that, in some embodiments, the user interface can be used by any suitable entity or user to access information associated with audio content items. For example, in some embodiments, the user interface can be used by users who have user accounts associated with the tracking service. As another example, in some embodiments, the user interface can be used by users regardless of whether they have user accounts associated with the tracking service.

At 214, process 200 can provide the requested information. In some embodiments, process 200 can provide the requested information in any suitable manner. For example, in some embodiments, process 200 can retrieve the information from any suitable source. As a more particular example, in some embodiments, process 200 can retrieve the information from the blockchain used to store data about audio content items.

In some embodiments, process 200 can provide any suitable information about the audio content item. For example, in some embodiments, process 200 can provide information about the creation of the audio content item (e.g., a name or other identifier of an artist who created the audio content item, a date and/or time the audio content item was created, and/or any other suitable information. As another example, in some embodiments, process 200 can provide version information about the audio content item (e.g., a number of versions available, differences between available versions, and/or any other suitable version information). As a more particular example, in some embodiments, process 200 can provide information indicating available splits of the audio content item. As yet another example, in some embodiments, process 200 can provide licensing information associated with the audio content item (e.g., whether or not the audio content item has been previously licensed, information indicating an entity that has licensed the audio content item, and/or any other suitable licensing information). As still another example, in some embodiments, process 200 can provide information indicating a submission history of the audio content item. As a more particular example, in some embodiments, process 200 can indicates dates the audio content item was submitted to different publishers, indications of publishers or third parties the audio content item has been submitted to, etc. As still another example, in some embodiments, process 200 can provide information indicating previous performances of the audio content item (e.g., that a particular version of the audio content item was included in a soundtrack associated with a particular commercial, and/or any other suitable performance information).

Note that, because information relating to creation of the audio content item, modification of the audio content item, submission of the audio content item to different publishers or other entities, performance of the audio content item, etc. have been previously logged and/or stored, process 200 can retrieve the previously logged information to provide the information in response to a request at 214. For example, in instances in which entries associated with the audio content item have been generated or updated using the blockchain, process 200 can access the information associated with the audio content item using the blockchain to provide the information at 214. In some embodiments, process 200 can access the information in any suitable manner, for example, using a track identifier associated with the audio content item that was generated at a time the audio content item was created using the plugin (e.g., as described above in connection with block 102 of FIG. 1).

At 216, process 200 can generate a license for the audio content item and can transmit the generated license for signing to suitable parties. In some embodiments, process 200 can generate the license in response to any suitable information. For example, in some embodiments, process 200 can receive an indication that a particular entity wants to license the audio content item (e.g., a particular third party, etc.). In some embodiments, process 200 can receive the indication in any suitable manner, such as via a user interface associated with a website provided by the tracking service. For example, in some embodiments, the user interface can receive a request to license the audio content item that includes any suitable information, such as a name of an entity that wants to license the audio content item, and/or any other suitable information. In some embodiments, process 200 can then generate the license using the information received via the user interface and/or any other suitable information. For example, in some embodiments, process 200 can generate a license that indicates any suitable information, such as any suitable parties involved in the license (e.g., an entity licensing the audio content item, an artist who created the audio content item, and/or any other suitable parties), payment terms associated with the license (e.g., royalties to be paid, etc.), and/or any other suitable license information.

In some embodiments, process 200 can transmit the generated license to any suitable parties for signing. For example, in some embodiments, process 200 can generate an email or other message that includes a link to the license and can cause the message to be transmitted. As a more particular example, in some embodiments, process 200 can cause the message that includes a link to the license for signing to be delivered via user accounts associated with the tracking service. In some embodiments, process 200 can then receive an indication in response to the license being signed (e.g., digitally signed, and/or signed in any suitable manner) by each of the parties to the license. In some embodiments, process 200 can store the signed license in any suitable manner (e.g., on tracking server 302, in connection with the blockchain, and/or in any other suitable manner).

Note that in some embodiments, process 200 can store information related to terms of the license (e.g., payment information associated with royalties, and/or any other suitable information) in connection with the blockchain. In some such embodiments, process 200 can use the terms of the license to facilitate royalty payments to the artist in response to detection of performance of the audio content item, as described above in connection with blocks 112-116 of FIG. 1.

Additionally, note that, in some embodiments, in response to the license being successfully signed, process 200 can cause notifications indicating the license agreement to be presented to any suitable users or entities. For example, in some embodiments, process 200 can cause messages to be transmitted to publishers or third parties who have received submissions of the audio content item (e.g., any version of the audio content item) but who have not licensed the audio content item, where the message indicates that the audio content item has now been licensed (e.g., exclusively licensed by a particular entity). As another example, in some embodiments, process 200 can cause a message to be transmitted to an agent or representative of the artist indicating that the audio content item has been licensed. In some embodiments, process 200 can transmit the messages in any suitable manner. For example, in some embodiments, the messages can be presented as notifications that are presented when a user logs in to an account associated with the tracking service. As another example, in some embodiments, a message can be transmitted as an email.

Turning to FIG. 3, an example 300 of hardware for tracking content items that can be used in accordance with some embodiments of the disclosed subject matter is shown. As illustrated, hardware 300 can include one or more servers such as a tracking server 302, a publishing server 304, and/or a detection server 306, a communication network 308, and/or one or more user devices 310, such as user devices 312 and 314.

In some embodiments, tracking server 302 can be any suitable server for receiving information about content items from user devices of content creators, facilitating submittal of content items to one or more publishers or other entities, receiving indications that performance of a particular content item has been detected, facilitating payment of a royalty to a content creator, and/or performing any other suitable functions. Note that, in some embodiments, tracking server 302 can be used to store any data associated with a blockchain that is used to store information about particular content items, such as a date of creation of the content item, a date of modification of the content item, a name of a creator of the content item, a date the content item was licensed to a third-party, one or more dates of performance of the content item, and/or any other suitable information. Additionally, in some embodiments, tracking server 302 can perform any suitable functions related to updating a blockchain and/or providing information stored in the blockchain in response to a request.

Note that, in some embodiments, tracking server 302 can be associated with a content tracking service. In some such embodiments, the content tracking service can provide a plugin that can be installed on a user device used to create audio content items, as described above in connection with FIG. 1. Additionally, in some embodiments, the content tracking service can provide a website that can be used for different purposes. For example, in some embodiments, the website can be used by an artist or a composer to submit an audio content item registered with the content tracking service (e.g., an audio content item associated with profile data that has been stored by the content tracking service) to a particular publisher or music house. As another example, in some embodiments, the website can be used by an artist or a composer to retrieve metrics associated with audio content items registered with the content tracking service. As yet another example, in some embodiments, the website can be used by any suitable entity to retrieve information associated with an audio content item registered with the content tracking service, such as information about different versions of the audio content item, information indicating submissions of the audio content item to different publishers or music houses, information indicating whether the audio content item is currently licensed, and/or any other suitable information.

In some embodiments, publishing server 304 can be any suitable server for publishing a particular content item. Note that, in some embodiments, publishing server 304 can be associated with any suitable third-party organization, such as a music house, a television channel, a radio station, a record label, an advertising agency, and/or any other suitable organization that may want to use a particular content item (e.g., incorporate a particular song or audio content item in an advertisement, in a television show, in a radio show, etc.).

In some embodiments, detection server 306 can be any suitable server for detecting performance of a particular content item. For example, in some embodiments, detection server 306 can store audio fingerprints of a particular audio content item and can detect an instance in which a content item associated with matching audio fingerprints is performed or played. As a more particular example, in some embodiments, detection server 306 can detect when a particular audio content item is included in an advertisement as a jingle, when a particular audio content item is included in a soundtrack of a television show or other video content item, etc.

Note that, as shown in FIG. 3, in some embodiments, the system shown in FIG. 3 can be a decentralized system. For example, in some embodiments, each of servers 302, 304, and/or 306 can be implemented as multiple nodes that can communicate in any suitable manner (e.g., using an API associated with the tracking service, and/or in any other suitable manner). In particular, note that, in some embodiments, publishing server 304 and/or detection server 306 can be implemented as nodes associated with the tracking service in any suitable manner. For example, in some embodiments, each node can be associated with any suitable DAPPs that can be used to interact with the tracking service. As a more particular example, in some embodiments, each node can operate a virtual private cloud which can run any suitable API applications and/or one or more DAPPs. In some embodiments, each node can be connected to any suitable network, such as an Ethereum network.

Note that, in some embodiments, a node (e.g., a detection node implemented as detection server 306, and/or any other suitable node) can be trusted or untrusted. In some embodiments, a node can be assigned an initial trust factor. In some embodiments, a trust factor of a trusted node can be fixed. In some embodiments, a trust factor of an untrusted node can be adjusted based on reported detections of performances of audio content items by the node. For example, in some embodiments, a trust factor of an untrusted node can be increased by any suitable amount in response to the tracking service confirming a reported detection of a performance of a particular audio content item. Note that, in some embodiments, in response to a confirmation of a particular detected performance, a node can be awarded any suitable payment (e.g., a predetermined number of tokens, and/or any other suitable payment).

Communication network 308 can be any suitable combination of one or more wired and/or wireless networks in some embodiments. For example, communication network 308 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 310 can be connected by one or more communications links to communication network 308 that can be linked via one or more communications links to server(s) 302, 304, and/or 306. Communications links can be any communications links suitable for communicating data among user devices 310 and server(s) 302, 304, and/or 306 such as network links, dial-up links, wireless links, hard-wired links, any other suitable communications links, or any suitable combination of such links.

In some embodiments, user devices 310 can include one or more computing devices suitable for creating content items, embedding tracking information in a content item, submitting a created content item to a publisher, and/or any other suitable functions. For example, in some embodiments, user devices 310 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 310 can be implemented as a non-mobile device such as a desktop computer, a set-top box, a television, a streaming media player, a game console, and/or any other suitable non-mobile device.

Although servers 302, 304, and 306 are each illustrated as a single device, the functions performed by servers 302, 304, and/or 306 can be performed using any suitable number of devices in some embodiments. For example, in some embodiments, multiple devices can be used to implement the functions performed by any of servers 302, 304, and/or 306. As another example, in some embodiments, functions performed by two or more of servers 302, 304, and/or 306 can be combined to be performed on a single device.

Although two user devices 312 and 314 are shown in FIG. 3, any suitable number of user devices, and/or any suitable types of user devices, can be used in some embodiments.

Figure 4:
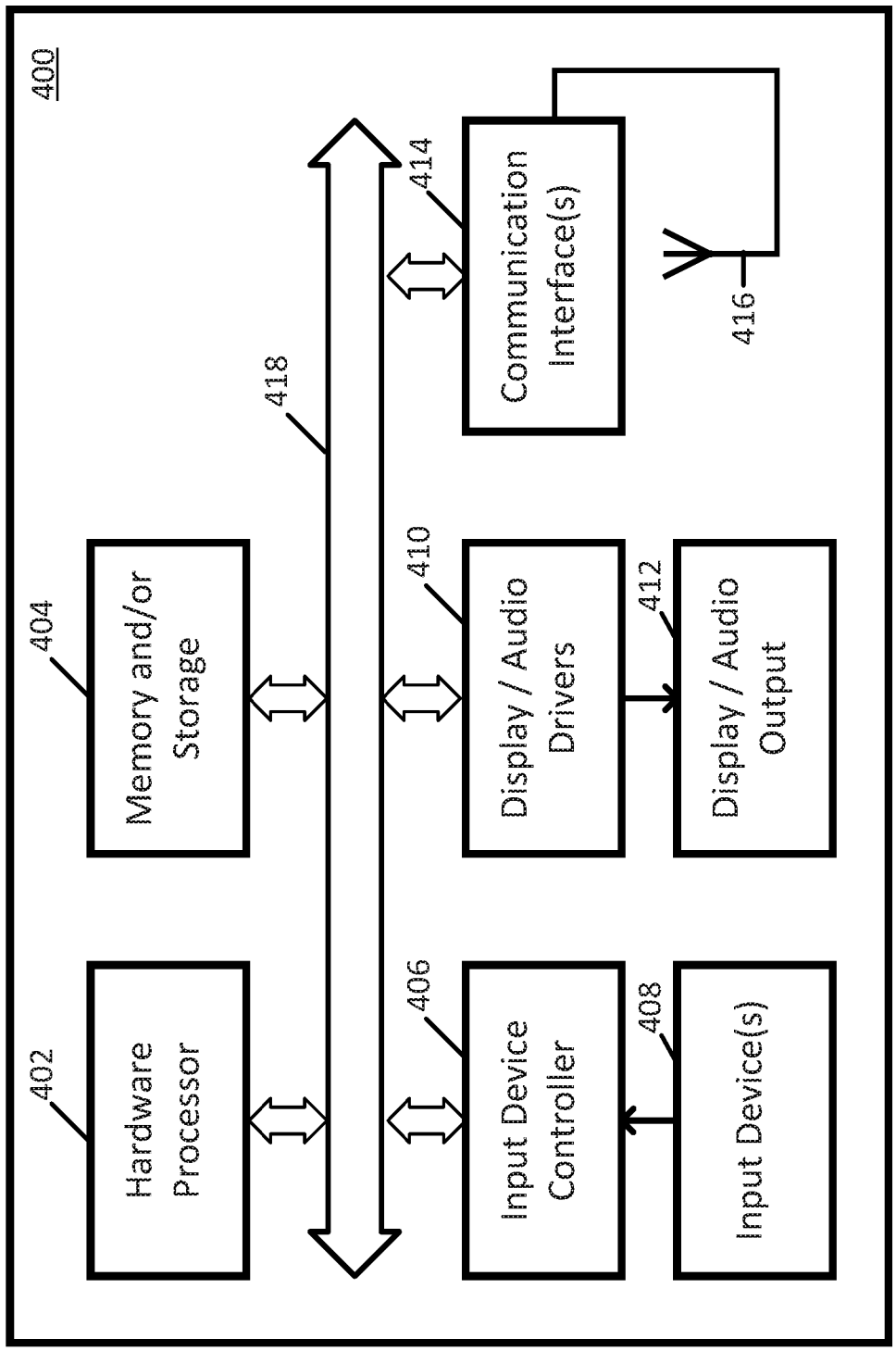
FIG. 4 shows a detailed example of hardware that can be used in a server and/or a user device of FIG. 3 in accordance with some embodiments of the disclosed subject matter.

Server(s) 302, 304, and 306, and user devices 310 can be implemented using any suitable hardware in some embodiments. For example, in some embodiments, devices 302, 304, 306, and 310 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as any of server(s) 302, 304, and/or 306). In some embodiments, hardware processor 402 can be controlled by a computer program stored in memory and/or storage 404 of user device 310.

Memory and/or storage 404 can be any suitable memory and/or storage for storing programs, data, media content, advertisements, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 308 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 308) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 300 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media. The set of instructions may be referred to as a computer program product (e.g. an item of commerce which can be hired or purchased).

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for analyzing spherical video content and, more particularly, for tracking content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for tracking content items, the method comprising:
receiving, at a server associated with a content tracking service from a digital audio workstation associated with a composer, profile data corresponding to an audio content item created using the digital audio workstation, wherein a plugin associated with the content tracking service is installed on the digital audio workstation and creates a communication channel between the digital audio workstation and the server associated with the content tracking service, wherein the plugin generates the profile data corresponding to the audio content item created using the digital audio workstation, embeds the profile data in the audio content item, and transmits at least the profile data to the server;
storing the profile data in connection with an identifier of the audio content item in a decentralized ledger, wherein the identifier is generated by the plugin at a first time that the audio content item was created using the digital audio workstation;

receiving, at the server from the user device associated with the composer, an indication that the audio content item has been modified using the digital audio workstation, wherein the indication is generated by the plugin at a second time that the audio content item was modified using the digital audio workstation;

in response to receiving the indication that the audio content item has been modified using the digital audio workstation, updating the stored profile data corresponding to the audio content item in the decentralized ledger to indicate a new version of the audio content item;

causing a user interface to be presented on the digital audio workstation associated with the composer, wherein the user interface includes at least one selectable input for selecting a publisher to which the audio content item is to be submitted, and wherein the user interface is presented within a website associated with the content tracking service;

in response to receiving an input via the user interface, causing a notification to be presented on a computing device associated with the publisher that indicates that the audio content item has been submitted to the publisher and updating the profile data stored in the decentralized ledger to indicate that the audio content item has been submitted to the publisher, wherein the notification is presented via a user interface presented within the website associated with the content tracking service;

receiving, via the user interface presented on the computing device associated with the publisher, a request for information associated with the audio content item; and in response to receiving the request, causing a subset of information included in the profile data corresponding to the audio content item from the decentralized ledger to be presented within the user interface presented on the computing device associated with the publisher.

2. The method of claim 1, wherein the profile data includes information indicating current rights associated with the audio content item.

3. The method of claim 2, wherein the current rights associated with the audio content item is updated in response to receiving, at the server associated with the content tracking service, an indication that the audio content item has been licensed.

4. The method of claim 1, wherein, in response to receiving the indication that the audio content item has been modified using the digital audio workstation, the stored profile data corresponding to the audio content item is updated in the decentralized ledger to indicate that the audio content item has been submitted to a different publisher.

5. The method of claim 1, wherein, in response to receiving the indication that the audio content item has been modified using the digital audio workstation, the stored profile data corresponding to the audio content item is updated in the decentralized ledger to indicate that a license has been signed in association with the audio content item.

6. The method of claim 1, wherein the identifier of the audio content item in the decentralized ledger is generated using a decentralized application associated with the decentralized ledger, wherein the identifier is stored in association with the profile data in the decentralized ledger.

7. The method of claim 1, wherein the method further comprises generating the license associated with the audio content item and transmitting the license associated with the audio content item to at least one party for signature.

8. A system for tracking content items, the system comprising:

a memory; and a hardware processor that, when executing computer executable instructions stored in the memory, is configured to:

receive, at a server associated with a content tracking service from a digital audio workstation associated with a composer, profile data corresponding to an audio content item created using the digital audio workstation, wherein a plugin associated with the content tracking service is installed on the digital audio workstation and creates a communication channel between the digital audio workstation and the server associated with the content tracking service, wherein the plugin generates the profile data corresponding to the audio content item created using the digital audio workstation, embeds the profile data in the audio content item, and transmits at least the profile data to the server;

store the profile data in connection with an identifier of the audio content item in a decentralized ledger, wherein the identifier is generated by the plugin at a first time that the audio content item was created using the digital audio workstation;

receive, at the server from the user device associated with the composer, an indication that the audio content item has been modified using the digital audio workstation, wherein the indication is generated by the plugin at a second time that the audio content item was modified using the digital audio workstation;

in response to receiving the indication that the audio content item has been modified using the digital audio workstation, update the stored profile data corresponding to the audio content item in the decentralized ledger to indicate a new version of the audio content item;

cause a user interface to be presented on the digital audio workstation associated with the composer, wherein the user interface includes at least one selectable input for selecting a publisher to which the audio content item is to be submitted, and wherein the user interface is presented within a website associated with the content tracking service;

in response to receiving an input via the user interface, cause a notification to be presented on a computing device associated with the publisher that indicates that the audio content item has been submitted to the publisher and updating the profile data stored in the decentralized ledger to indicate that the audio content item has been submitted to the publisher, wherein the notification is presented via a user interface presented within the website associated with the content tracking service;

receive, via the user interface presented on the computing device associated with the publisher, a request for information associated with the audio content item; and in response to receiving the request, cause a subset of information included in the profile data corresponding to the audio content item from the decentralized ledger to be presented within the user interface presented on the computing device associated with the publisher.

9. The system of claim 8, wherein the profile data includes information indicating current rights associated with the audio content item.

10. The system of claim 9, wherein the current rights associated with the audio content item is updated in response to receiving, at the server associated with the content tracking service, an indication that the audio content item has been licensed.

11. The system of claim 8, wherein, in response to receiving the indication that the audio content item has been modified using the digital audio workstation, the stored profile data corresponding to the audio content item is updated in the decentralized ledger to indicate that the audio content item has been submitted to a different publisher.

12. The system of claim 8, wherein, in response to receiving the indication that the audio content item has been modified using the digital audio workstation, the stored profile data corresponding to the audio content item is updated in the decentralized ledger to indicate that a license has been signed in association with the audio content item.

13. The system of claim 8, wherein the identifier of the audio content item in the decentralized ledger is generated using a decentralized application associated with the decentralized ledger, wherein the identifier is stored in association with the profile data in the decentralized ledger.

14. The system of claim 8, wherein the hardware processor is further configured to generate the license associated with the audio content item and transmit the license associated with the audio content item to at least one party for signature.

15. A non-transitory computer-readable medium containing computer executable instructions that, when executed by a processor, cause the processor to perform a method for tracking content items, the method comprising:
- receiving, at a server associated with a content tracking service from a digital audio workstation associated with a composer, profile data corresponding to an audio content item created using the digital audio workstation, wherein a plugin associated with the content tracking service is installed on the digital audio workstation and creates a communication channel between the digital audio workstation and the server associated with the content tracking service, wherein the plugin generates the profile data corresponding to the audio content item created using the digital audio workstation, embeds the profile data in the audio content item, and transmits at least the profile data to the server;
- storing the profile data in connection with an identifier of the audio content item in a decentralized ledger, wherein the identifier is generated by the plugin at a first time that the audio content item was created using the digital audio workstation;
- receiving, at the server from the user device associated with the composer, an indication that the audio content item has been modified using the digital audio workstation, wherein the indication is generated by the plugin at a second time that the audio content item was modified using the digital audio workstation;
- in response to receiving the indication that the audio content item has been modified using the digital audio workstation, updating the stored profile data corresponding to the audio content item in the decentralized ledger to indicate a new version of the audio content item;
- causing a user interface to be presented on the digital audio workstation associated with the composer, wherein the user interface includes at least one selectable input for selecting a publisher to which the audio content item is to be submitted, and wherein the user interface is presented within a website associated with the content tracking service;
- in response to receiving an input via the user interface, causing a notification to be presented on a computing device associated with the publisher that indicates that the audio content item has been submitted to the publisher and updating the profile data stored in the decentralized ledger to indicate that the audio content item has been submitted to the publisher, wherein the notification is presented via a user interface presented within the website associated with the content tracking service;
- receiving, via the user interface presented on the computing device associated with the publisher, a request for information associated with the audio content item; and
- in response to receiving the request, causing a subset of information included in the profile data corresponding to the audio content item from the decentralized ledger to be presented within the user interface presented on the computing device associated with the publisher.

16. The non-transitory computer-readable medium of claim 15, wherein the profile data includes information indicating current rights associated with the audio content item.

17. The non-transitory computer-readable medium of claim 16, wherein the current rights associated with the audio content item is updated in response to receiving, at the server associated with the content tracking service, an indication that the audio content item has been licensed.

18. The non-transitory computer-readable medium of claim 15, wherein, in response to receiving the indication that the audio content item has been modified using the digital audio workstation, the stored profile data corresponding to the audio content item is updated in the decentralized ledger to indicate that the audio content item has been submitted to a different publisher.

19. The non-transitory computer-readable medium of claim 15, wherein, in response to receiving the indication that the audio content item has been modified using the digital audio workstation, the stored profile data corresponding to the audio content item is updated in the decentralized ledger to indicate that a license has been signed in association with the audio content item.

20. The non-transitory computer-readable medium of claim 15, wherein the identifier of the audio content item in the decentralized ledger is generated using a decentralized application associated with the decentralized ledger, wherein the identifier is stored in association with the profile data in the decentralized ledger.

21. The non-transitory computer-readable medium of claim 15, wherein the method further comprises generating the license associated with the audio content item and transmitting the license associated with the audio content item to at least one party for signature.

* * * * *